Aug. 9, 1938.  J. L. CREVELING  2,126,452

LUBRICATING DEVICE AND METHOD OF SECURING SAME

Filed Feb. 17, 1936

INVENTOR
JOHN L. CREVELING.
BY
ATTORNEY

Patented Aug. 9, 1938

2,126,452

UNITED STATES PATENT OFFICE 2,126,452

LUBRICATING DEVICE AND METHOD OF SECURING SAME

John L. Creveling, near Tucson, Ariz., assignor to The Lubrication Corporation, Chicago, Ill., a corporation of Delaware Application February 17, 1936, Serial No. 64,269

5 Claims. (Cl. 29—157)

This invention relates to lubricating devices and more particularly to lubricant receiving fittings and a method of securing them to machine parts.

In lubricating systems employing fittings to be permanently or semi-permanently secured to machine bearings or other parts to be lubricated, it is desirable to be able to secure such fittings to the machine parts quickly and easily in order to maintain the cost of assembly at a minimum. At the same time it desirable to be able to remove the fittings for replacement in the event that they should be damaged.

Fittings have heretofore been secured in place by providing them with screw threaded shanks adapted to screw into tapped holes in the machine parts and this arrangement securely holds the fittings in place and at the same time permits their ready removal for replacement. However, to utilize this system it is necessary to drill and tap a hole in each machine part which is to receive a fitting, which is a relatively expensive operation, and a great deal of time is consumed in screwing the fittings into the holes. It is accordingly one of the objects of the present invention to provide a novel fitting which can be secured quickly and easily to a machine part and which can be removed readily for replacement.

A further object of the invention is to provide a method of securing a fitting to a machine part quickly and easily in such a manner that it can be removed readily.

A still further object is to secure a standard screw threaded fitting to a receiving member by driving it into place.

Another object is to provide a threaded sleeve which may be secured to a machine part by driving to receive a standard screw threaded fitting.

Other objects, advantages and novel features of the invention will be apparent from the following description when read in connection with the accompanying drawing, in which.

Figure 1:
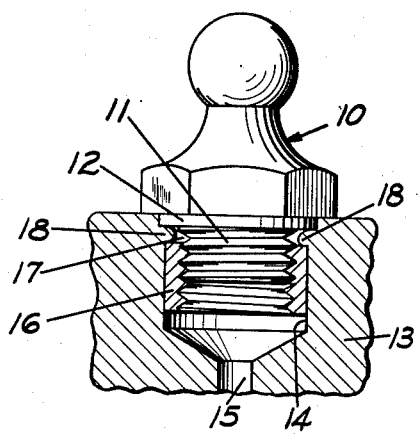
Fig. 1 is a central section with parts in elevation illustrating a fitting secured to a machine part according to the invention.

According to the present invention, a fitting is secured to a machine part by providing an internally threaded sleeve which is adapted to receive a threaded fitting shank and which is held in place in a bore in the machine part by an inwardly extending projection from the bore engaging a suitable shoulder or notch on the sleeve. Fig. 1 illustrates a fitting indicated generally at 10 which may be of any desired type or shape and which includes a threaded shank 11 by which it is fastened to the machine part. A driving shoulder 12 is formed on the fitting between the shank and the body of the fitting and has a diameter considerably greater than that of the shank. The fitting is adapted to be secured to a machine part shown at 13 having a bore 14 larger than the shank 11 and which communicates with a bore 15 leading to a bearing or other part to be lubricated.

In order to secure the shank in the bore an internally threaded sleeve 16 is provided adapted to threadedly receive the shank 11 and having an external diameter less than that of the drive shoulder and substantially the same as the diameter of the bore 14. The sleeve 16 is provided at one end with peripheral notches 17 shown as being four in number although it will be apparent that any other desired number could be provided.

Figure 3:
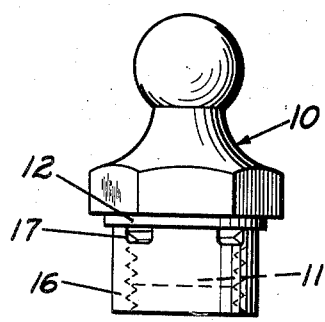
Fig. 3 is an elevation of the fitting of Fig. 1 with the sleeve assembled thereon.

To assemble the sleeve and fitting in the bore in the machine part, the sleeve is preferably first screwed onto the shank 11 as shown in Fig. 3 with the notches 17 adjacent the drive shoulder 12. The end of the sleeve is then inserted into the bore 14 and is pressed or driven in by pressing or hammering on the fitting through a suitable drive tool until the drive shoulder 12 engages with the surface of the part 13. Upon the application of further pressure or several more hammer blows a portion of the metal of part 13 will be deformed to provide projections 18 extending into and interlocking with the notches 17 to hold the sleeve firmly in place against rotation and also against axial displacement due to the action of lubricant pressure on the lower surfaces of the sleeve and shank. At the same time the metal of part 13 is pressed closely against the sleeve 15 entirely around its periphery to provide a fluid tight joint between the part 13 and sleeve 16 so that the sleeve is tightly sealed both mechanically and against fluid leakage in the bore 14. If desired, the sleeve may be secured in the bore by a tool and the fitting later screwed into the sleeve, but it is preferable to put the sleeve on the fitting and drive or force both parts into the bore as described above.

Figure 2:
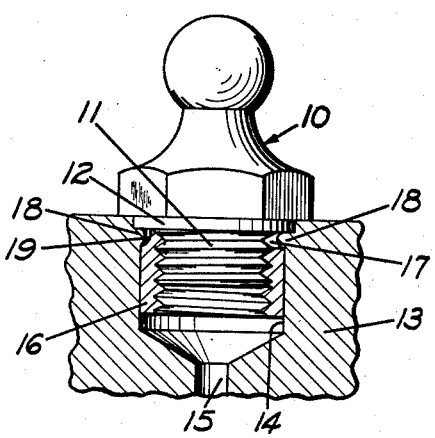
Fig. 2 is a view similar to Fig. 1 of a modified construction.
Figure 4:
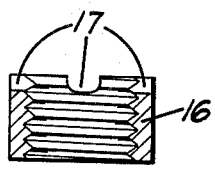
Figs. 4 and 5 are central sections of the sleeves of Figs. 1 and 2 respectively.
Figure 5:
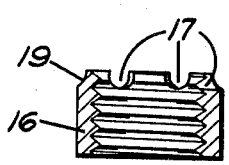

Figs. 2 and 5 illustrate a modified construction, parts therein corresponding to like parts in Figs. 1, 3 and 4 being designated by the same reference numbers for the sake of brevity of description.

The sleeve 16 of Figs. 2 and 5 in addition to being formed with the peripheral notches 17 is cut away at its upper portion to provide an outwardly facing annular shoulder 19. When this sleeve is driven into the machine part, a projection 18 will be formed by the drive shoulder 12 for interlocking engagement with the shoulder 19 entirely around the periphery of the sleeve to hold the sleeve securely in the bore. The projecting part 18 will also extend into the notches 17 thereby to prevent rotation of the sleeve in the bore or if desired the notches can be omitted and the outer surface of the sleeve roughened to prevent rotation of the sleeve in the bore.

It will be apparent that the sleeve 16 may be manufactured cheaply in a screw machine or the like and assembled on the fitting at the factory at a very low cost. The fittings with the sleeves assembled thereon may be taken to the desired point of use and driven into bored machine parts quickly and easily without requiring tapping of the machine parts. It will also be apparent that a wide tolerance may be allowed in drilling the holes 14 and both mechanical and fluid tight seals may still be obtained due to deformation of the machine parts around the sleeve and into the notches or against the shoulder. Should the fitting be damaged it may readily be unscrewed and replaced by a new fitting. Thus the present invention combines the advantages of drive type and screw type fittings retaining the low cost and easy assembly of the former with the ready replaceability and tight seal of the latter.

While two embodiments of the invention have been shown and described, it will be apparent that many changes may be made therein and it is not intended to be limited to the forms shown or otherwise than by the terms of the appended claims.

I claim:

1. The method of securing a lubrication fitting having a threaded shank within a bore formed in a metal body comprising, forming an internally threaded sleeve, forming a circumferential longitudinally facing shoulder adjacent to one end of the sleeve, forming peripheral notches adjacent to said shoulder, inserting the sleeve into the bore with said shoulder in the bore facing outwardly and with the opposite end of the sleeve forming an inwardly facing surface adapted to be exposed to the pressure of the fluid within said bore, and displacing portions of the metal of said body therefrom into interlocking engagement with said shoulder and said notches to retain the sleeve in the bore against rotation therein and against the action of lubricant pressure tending to force the sleeve from the bore.

2. The method of securing a lubrication fitting having a threaded shank within a bore formed in a metal body comprising, forming an internally threaded sleeve, forming peripheral notches in said sleeve, screwing said sleeve on the threaded shank of a fitting, inserting said sleeve and shank into said bore, and applying force to the fitting to force the shank and sleeve into the bore until a portion of the fitting engages said body to displace metal therefrom into interlocking engagement with said notches to retain said sleeve in the bore against rotation therein and against the action of lubricant pressure on the lower end of the sleeve and the shank tending to force them from the bore.

3. The method of securing a lubrication fitting having a threaded shank within a bore formed in a metal body comprising, forming an internally threaded sleeve, forming a circumferential longitudinally facing shoulder adjacent to one end of the sleeve, forming peripheral notches adjacent to said shoulder, screwing said sleeve on the threaded shank of a fitting with the shoulder facing away from the end of the shank, inserting the sleeve and shank into said bore with the ends of the sleeve and shank forming inwardly facing surfaces adapted to be exposed to the pressure of fluid within the bore, and applying force to the fitting to force the shank and sleeve into the bore until a portion of the fitting engages said body to displace metal therefrom into interlocking engagement with said shoulder and said notches to retain said sleeve in the bore against rotation therein and against the action of lubricant pressure on said surfaces tending to force the fitting from the bore.

4. In combination with a member having a bore therein and a lubrication fitting having a threaded shank and a drive shoulder, an internally threaded sleeve adapted to receive said shank and having an outside diameter less than the diameter of said drive shoulder and substantially equal to the diameter of the bore, said sleeve being formed with an outwardly facing shoulder and a peripheral notch, and means including a projection displaced inwardly from the wall of the bore for engaging said outwardly facing shoulder and said notch to hold the sleeve against rotation in the bore and against axial displacement therefrom but permitting removal of the fitting by unscrewing it from the sleeve.

5. The method of securing a lubrication fitting having a threaded shank within a bore formed in a metal body comprising forming an internally threaded sleeve with a longitudinally facing shoulder adjacent one end thereof, screwing said sleeve on the threaded shank of a fitting with said shoulder facing away from the end of the shank, inserting said sleeve and shank into said bore with the ends of the sleeve and shank forming inwardly facing surfaces adapted to be exposed to the pressure of fluid within the bore, and applying force to the fitting to force the shank and sleeve into the bore until a portion of the fitting engages said body to displace metal therefrom into engagement with said shoulder to hold said sleeve in the bore against displacement therefrom.

JOHN L. CREVELING.